United States Patent [19]

Avsan et al.

[11] 3,761,884

[45] Sept. 25, 1973

[54] ARRANGEMENT FOR SYNCHRONIZING A NUMBER OF CO-OPERATING COMPUTERS

[75] Inventors: Oleg Avsan, Huddinge; Agnar Vidar Grodal, Farsta, both of Sweden

[73] Assignee: Telefonaktiebolaget LM Ericsson, Stockholm, Sweden

[22] Filed: Nov. 4, 1971

[21] Appl. No.: 195,682

[30] Foreign Application Priority Data

Nov. 20, 1970 Sweden ............................ 15702/70

[52] U.S. Cl. ............................................. 340/172.5

[51] Int. Cl. ............................................. G06f 15/16

[58] Field of Search ................... 340/172.5; 235/157

[56] References Cited

UNITED STATES PATENTS

| | | | |
|---|---|---|---|
| 3,312,951 | 4/1967 | Hertz | 340/172.5 |
| 3,551,892 | 12/1970 | Driscoll | 340/172.5 |
| 3,480,914 | 11/1969 | Schlaeppi | 340/172.5 |
| 3,576,570 | 4/1971 | Meier | 340/172.5 |
| 3,364,472 | 1/1968 | Sloper | 340/172.5 |
| 3,214,739 | 10/1965 | Gountainis et al. | 340/172.5 |
| 3,421,150 | 1/1969 | Quosig et al. | 340/172.5 |

*Primary Examiner*—Paul J. Henon
*Assistant Examiner*—Mark Edward Nusbaum
*Attorney*—Frederick E. Hane et al.

[57] ABSTRACT

A synchronizing apparatus in a data system comprising a number of individual computers each of which includes a binary counter. The synchronization implies that a predetermined value should be stored in certain positions in counters in all the computers. A synchronizing signal is sent on a common line interconnecting all the computers from the computer which operates more rapidly than the other computers of the system and when reaching the predetermined value in the associated counter, this signal being fed is all the other counters in order to set these counters to such predetermined value.

3 Claims, 5 Drawing Figures

INVENTORS
Oleg Ausan
Angunn Vidar Grödal
BY Kane, Dalsimer, Kane, Sullivan and Kurucz
ATTORNEYS INVENTORS
Olee Ausan
Angnar Uidar Grödal
BY Hane, Baxley and Spiecens
ATTORNEYS INVENTORS
OLEG AVSAN
ANGVAR UIDAR GRÖDAL
BY Hane, Baxley and Spiecens
ATTORNEYS

ARRANGEMENT FOR SYNCHRONIZING A NUMBER OF CO-OPERATING COMPUTERS

The present invention relates to an arrangement in a data processing system consisting of a number of co-operating computers wherein the length of a primary interval is determined when a counter has reached a determined counting position or digit value. More specifically the invention concerns synchronizing the counters in the respective computers with each other, such synchronization implying that such digit value is stored in a determined number of digit positions in such counter in all computers.

In a computer system consisting of several cooperating computers the computers should be synchronized with each other in order to be able jointly to utilize, for example, memory units and to exchange information between each other. It was previously known to let several computers be controlled by a common clock oscillator. This method causes, however, the great disadvantage that if the clock oscillator becomes faulty, the whole computer system is affected by this faultiness.

A main object of the invention is to ensure that the computers are synchronized with each other in such a manner, that each computer primarily is controlled by an own clock oscillator and that the synchronization occurs periodically by means of some of the computers.

The characteristics of the invention appear from the appended claims.

Figure 1:
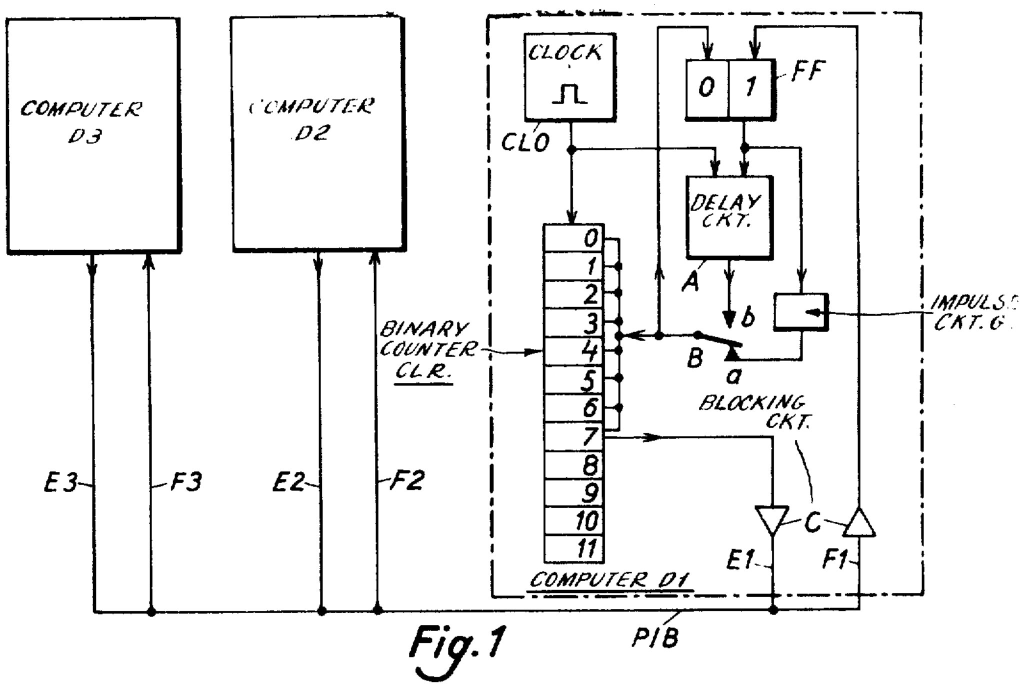
Figure 2:
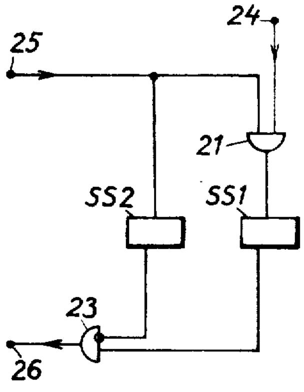
Figure 3:
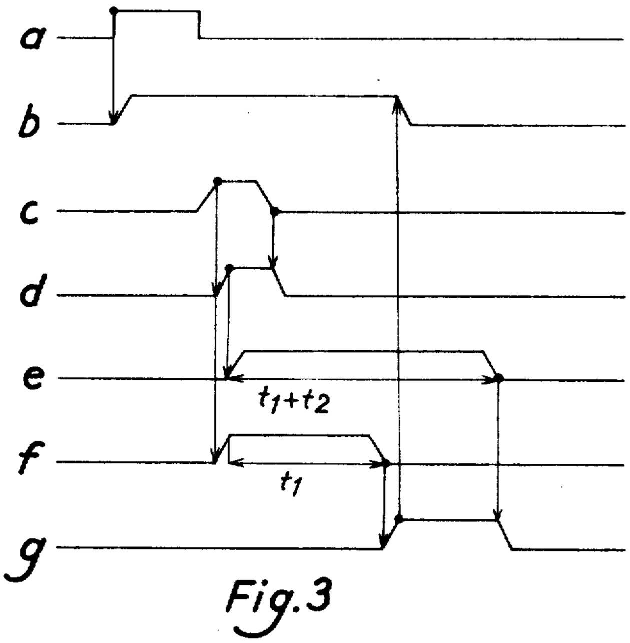
Figure 4:
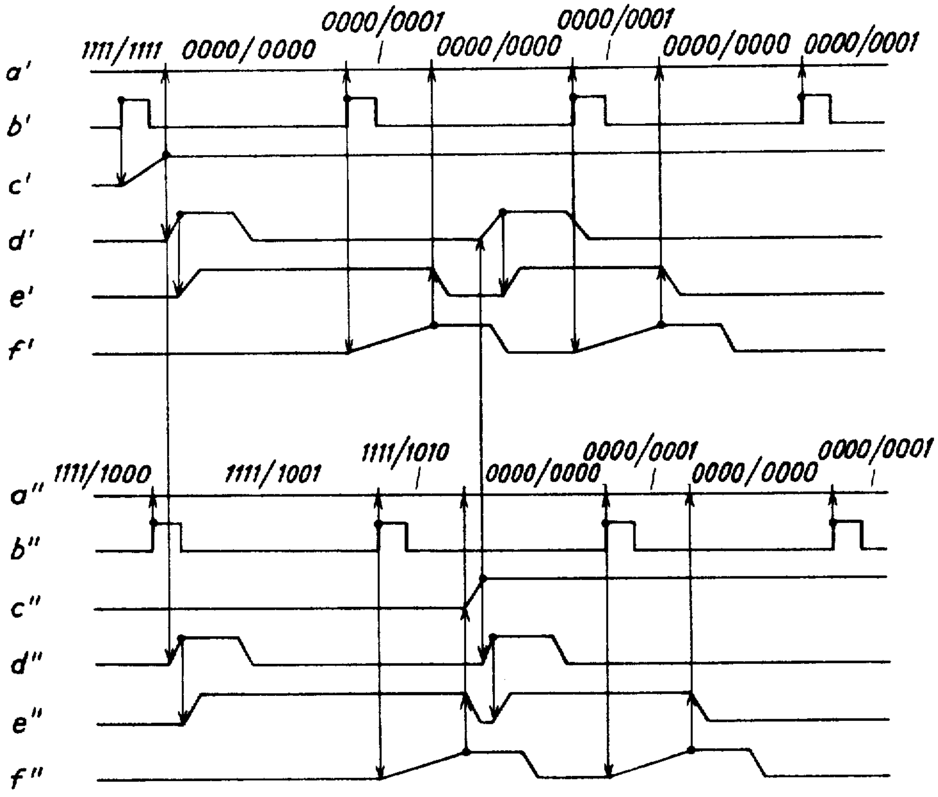
Figure 5:
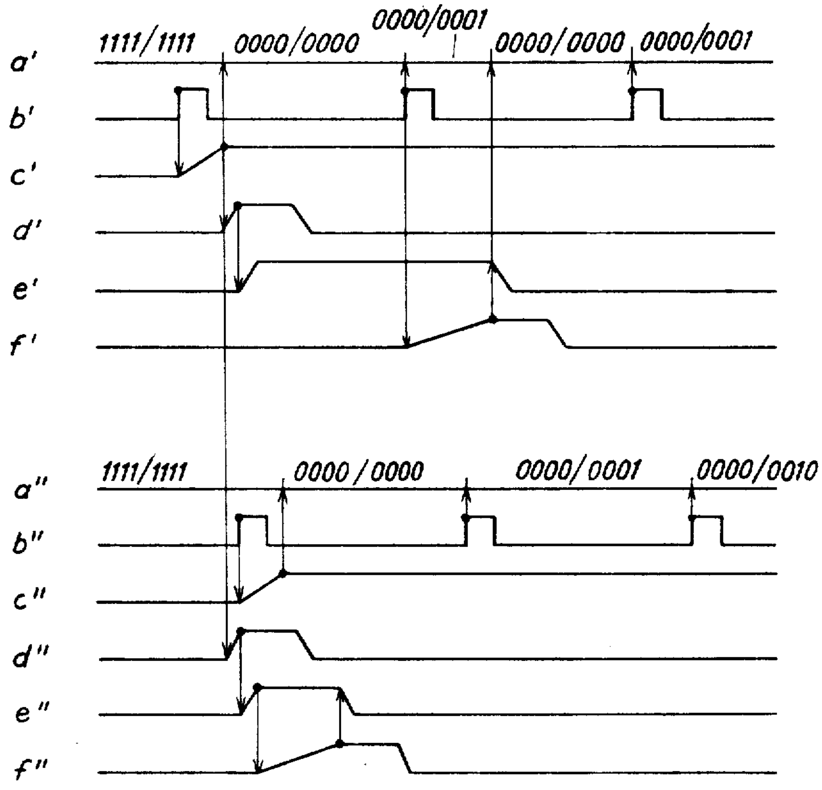

The invention will be explained in connection with the accompanying drawings, of which FIG. 1 is an example utilizing a block diagram of a system consisting of three computers embodying the invention, FIG. 2 shows more in detail the construction of one of the blocks in FIG. 1. and FIGS. 3 — 5 are explaining diagrams.

In FIG. 1, D1, D2 and D3 denote three computers which are connected to each other by means of a line PIB. In the figure only that apparatus is shown which is necessary for explaining the invention. The apparatus is assumed to be built up in the same manner in the three computers. The clock oscillator CLO of the computer is arranged to step a binary counter CLR which consists of for example 12 series-connected binary stepping flip-flops, i.e., the counter has 12 digit positions which in the figure are numbered 0–11 and in which the digit position 0 indicates the least significant digit.

Briefly the synchronizing arrangement can be described as follows: the clock oscillators in the computers step the respective counters forward, and it is assumed that the counter in the computer D3 is stepped most rapidly. This counter will thus first occupy for example the counting position which is indicated when the flip-flop in the digit position 7 changes from 1 to 0, so that the eight less significant digit positions contain zeros. By the switching over of said flip-flop, a synchronizing signal is delivered on the line E3. This synchronizing signal is fed to the common line PIB and, moreover, to all computers through the lines F1, F2 and F3. The operation which is caused by such incoming synchronizing signal is the same in the computers D1 and D2, and therefore only the operation in the computer D1 will be explained more in detail.

The incoming synchronizing signal is supplied to the computer D1 through the line F1 via a circuit C which blocks the outgoing signals from the computer and further supplied to the one-setting input of a bistable flip-flop circuit FF. This flip-flop circuit blocks the following synchronizing signals for a certain time interval after the first synchronizing signal has arrived, as it will be explained later. All the computers deliver a synchronizing signal when their associated counters either by stepping or by synchronizing occupy the previously mentioned determined counting position, but, consequently, it is only the first of these synchronizing signals which can influence the synchronization of the associated computers by one-setting the flip-flop circuit FF. According to a more simple solution which is indicated by the position a of a switch contact B this one-setting of the flip-flop circuit activates an impulse circuit G which accordingly produces a pulse. This pulse is on the one hand fed back to the flip-flop circuit FF thereby zero-setting and locking the same in this state for a time corresponding to the duration of said pulse and on the other hand fed to the control input of the counter CLR. In this manner the eight less significant digit positions are zero-set, i.e., the digit positions 0–7, so that the counter occupies the same counter position as the counter in the computer D3 which delivered the synchronizing signal.

In certain cases, however, it can be unsuitable that at any time to let the incoming synchronizing signal be fed to the counter, as the synchronization then will appear simultaneously with the counter being stepped forward by the clock oscillator. The simultaneousness of these two switching operations can namely cause undesired transients to arise in the counter which entails that the stepping of the counter will not become unambiguously defined.

By arranging for example a delay circuit A between the output of the flip-flop circuit FF and the control input of the counter CLR, it is assured that the synchronization does not occur during the time the counter is activated. This solution is indicated by the position b of the switch-contact B. A synchronizing signal which is delivered by a counter in dependence on its digit position 7 being changed from 1 to 0, is transformed to a pulse either in the circuit C on the outgoing line from the sending computer or in the circuit C on the incoming line to the receiving computer.

FIG. 2 shows the construction of the delay circuit A of FIG. 1. The input 24 is connected to the one-output of the flip-flop circuit FF in FIG. 1 and to the input 25 the stepping pulses of the clock oscillator CLO are fed. The stepping pulse is fed to an input of an AND-circuit 21 provided with two inputs, to the second input of which the signal from the one-output of the flip-flop circuit is fed. By means of this AND-circuit, a stepping pulse must be present before a signal is fed to a pulse forming circuit SS1 which for example consists of a monostable flip-flop. The pulse which is formed by the circuit SS1 has a length which can be considered as divided into two time periods $t_1$ and $t_2$, where $t_1$ is the maximum time period for stepping of the eight less significant positions of the counter CLR and $t_2$ is the time period during which the flip-flop circuit FF will block further incoming synchronizing pulses, i.e., the time needed for the synchronization of the counter. The pulse from the circuit SS1 is fed to one input of an AND-circuit 23 provided with two inputs. The stepping pulse from the clock oscillator is furthermore adapted to activate a further pulse forming circuit SS2, consisting of, for example, a monostable flip-flop. The pulse formed by the circuit SS2 has a time length $t_1$, and is fed to the second input of the AND-circuit 23, which constitutes an inverting input. On the output of the AND-circuit 23 a pulse is herewith obtained having the length $t_2$ with a front flank which is situated at the distance $t_1$ after the front flank of the stepping pulse. The pulse from the AND-circuit 23 is fed from the output 26 on the one hand to the flip-flop circuit FF so that this circuit, at the end of the pulse, ceases to block incoming synchronizing signals and on the other hand is fed to the control input of the counter CLR in order to zero-set the eight less significant digit positions, i.e., the digit positions 0–7, said counter being of such type that the digit position 8 being stepped one step.

How synchronization is obtained will be explained more in detail by means of the diagram in FIG. 3 in which the vertical arrows indicate the cause and effect of the pulses. The horizontal axis of the diagram shows the time. FIG. 3*a* shows the synchronizing signal which, for example, from the computer D3 comes to the flip-flop circuit FF of the computer D1. The flip-flop circuit is one-set by the synchronizing signal which is indicated by the vertical arrow from FIG. 3*a* to FIG. 3*b* in the figure. FIG. 3*b* shows the signal on the output of the flip-flop circuit FF, i.e., on the input 24 in FIG. 2. Nothing will occur until the stepping pulse comes from the clock oscillator of the computer to the input 25 in FIG. 2. FIG. 3*c* shows the stepping pulse and FIG. 3*d* shows the signal on the output of the AND-circuit 21. In the diagram it is indicated that the pulse in FIG. 3*d* is caused by the pulse in FIG. 3*c* which is correct provided that the flip-flop circuit is one-set, i.e., the signal in FIG. 3*b* has a high level. The pulse in FIG. 3*d* activates the monostable flip-flop circuit SS1 which produces a pulse with the length $t_1 + t_2$, FIG. 3*e*. The stepping pulse in FIG. 3*c* furthermore activates the monostable flip-flop circuit SS2 which produces a pulse with the length $t_1$, FIG. 3*f*. By the inverting of the pulse of FIG. 3 when being fed to the AND-circuit 23, a pulse will be produced on the output of this circuit when the pulse from the flip-flop circuit SS2 has ceased, see FIG. 3*g*. The pulse in FIG. 3*g* will consequently have a length $t_2$ which consists of the difference of the lengths of the pulses produced by the two flip-flop circuits SS1 and SS2. The pulse in FIG. 3*g* synchronizes the counter by zero-setting the digit positions 0–7. This pulse also zero-sets the flip-flop circuit FF, thus maintaining said circuit FF locked in this position during the duration of the pulse, i.e., until the synchronization is being carried out.

A stepping interval is defined as the time elapsing between two consecutive stepping pulses from the clock oscillator CLO. The synchronizing process can be divided into two main possibilities and, for the sake of simplicity, starting from a system with only two computers, one main possibility will be that the counter of the first computer at the time of the synchronization is in a state which is one stepping interval after that of the counter of the second computer. The other main possibility is that the counting state of said one counter is less than one stepping interval after the counting state of the other counter.

FIG. 4 shows diagrammatically how synchronization is carried out in a two-computer system when the counting state of said one counter is more than one stepping interval after the second counter.

When a synchronizing signal is present for example from the computer D1 on the line E1 in FIG. 1, this signal will be fed both to the other computers in the system, and to the line F1 in the same computer D1. Such a signal will in the continuation be called "own synchronizing signal."

FIG. 4*a'*, *b'*, . . . *f'* show the signals in the computer D1 and FIG. 4*a''*, *b''*. . . *f''* show the signals in the computer D2, the counter of which lies more than one stepping interval after the counter of the computer D1. FIG. 4*a'* and *a''* show the values in the digit positions 0–7 in the respective computer, FIG. 4*b'* and *b''* show stepping pulses, FIG. 4*c'* and *c''* show outgoing synchronizing signals, FIG. 4*d'* and *d''* show incoming synchronizing signals. In the FIG. 4*e'* and *e''*the high signal level shows the case when the flip-flop circuit FF is zero-set, and FIG. 4*f'* and *f''* show the signal which zero-sets the digit positions 0–7 of the counter and which zero-sets the flip-flop circuit FF.

It is assumed that the counters of the more rapid computer D1 have "ones" in their eight less significant digit positions (FIG. 4*a'*). This entails that when the counter is stepped the next time, a synchronizing signal should be delivered (FIG. 4*b'* and *c'*). This synchronizing signal is fed on one hand to the computer D2 which is shown in FIG. 4*d''* and on the other hand as "own synchronizing signal" to the computer D1 (FIG. 4*d''*). The flip-flops FF are one-set in the two computers, FIG. 4*e'* and *e''*, whereupon the synchronizing signal awaits a new stepping pulse. According to the example the computer D2 lies 7 steps after the computer D1 and when the next stepping pulse appears in each computer, these counters are stepped one step and after that, both the counters are synchronized by the waiting synchronizing signals so that the digit positions 0–7 will include "zeros."

As mentioned before, a synchronizing signal is produced only when the digit position 7 shifts its value from "one" to "zero."Upon this synchronization this will occur in the computer D2, in consequence of which this sends a synchronizing signal to the computer D1 (the second pulse in FIG. 4*d'*) and "own synchronizing signal" to the computer D2 (second pulse in FIG. 4*d''*), whereby the synchronizing operation is repeated a second time in the two computers. This time, however, none of the digit positions 7 of the counters shift from "one" to "zero," for which reason no further synchronizing signals are produced. Thus at this described synchronizing process, the actual digit positions were zero-set in the counter twice each.

FIG. 5 shows diagrammatically how synchronization occurs in a two-computer system when one of the counters lies less than a stepping interval after the other counter.

FIG. 5*a'*, *b'*, . . . *f'* show the signals in the computer D1 and FIG. 4*a''*, *b''*, . . . *f''* show the signals in the computer D2, the counter of which lies less than one stepping interval after the counter of the computer D1.

FIG. 5 shows the signals in the same manner as FIG. 4. The counters of the two computers have "ones" in their eight less significant digit positions according to FIG. 5*a'*, *a''*. The stepping pulse in the computer D1 (FIG. 5*b'*) is somewhat prior to the stepping pulse in the computer D2 (FIG. 5*b''*), for which reason the counter in the computer D1 will be stepped by the stepping pulse so that it includes "zeros" in the digit positions 0–7 simultaneously as the synchronizing signal is produced (FIG. 5c'). This synchronizing signal has no effect in computer D2, because meanwhile its counter has obtained "zeros" by the influence of a stepping pulse (FIG. 5b'') in the digit positions 0–7 (FIG. 5a''). On the other hand, the computer D1 obtains "own synchronizing signal" (FIG. 5d') which synchronizes the counter after that the next stepping pulse has been obtained and, consequently, when the counter has had time to be stepped one step (FIG. 5a'). This can be summarized so that when the counters of two computers differ in time less than one stepping interval, the more rapid counter will await the slower counter.

From these two cases it appears that the effect of the synchronizing signals fed between co-operating computers within a system, to a large extent will depend on the tolerance of the clock oscillators. The more narrow the tolerances are, the less is the probability that the double synchronizing process occurs, as has been described in connection with FIG. 4.

Thereby that the most frequent synchronizing process is that the most rapid computer awaits the slower ones, the same computer will not all the time control the synchronization but an alternation of synchronizing computers appears. This can be seen from FIG. 5, where the computer D1 is so much delayed that it after the synchronization will lie after computer D2 so that the next synchronizing signal with a great probability will be generated by the computer D2.

In a system including a number of computers the controlling of the synchronization will change irregularly between the computers, but the computers, the counters of which are stepped most rapidly, will control the synchronization on an average more often than other computers.

We claim:

1. In a digital computer system comprising a number of computers, each including an $n$-digit binary counter which is incremented by stepping pulses generated by a clock circuit where said counter when reaching a predetermined count position determines an interval at the beginning of which each computer shall return to a specific point in a program, each computer including an arrangement for synchronizing said counter by setting certain of said $n$ digits of the counter to a predetermined binary value by means of a set pulse, and means for producing a synchronizing signal when said counter reaches a predetermined position, and each computer being connected to a common bus line to enable the synchronizing signal produced in one of said computers to be transferred to all of the computers, said arrangement comprising: a blocking logic circuit including a bistable circuit, having a set input, reset input and an output, said bistable circuit being triggered to a set state upon receipt of a signal at said set input and being triggered to a reset state upon receipt of a signal at said reset input; means for transmitting said synchronizing signal to said set input; a pulse generating circuit having an input connected to said bistable circuit and an output for delivering said set pulse to said counter when said bistable circuit is set by said synchronizing signal; and locking means for connecting the output of said pulse generating circuit to said reset input of said bistable circuit in order for said bistable circuit to be reset by said set pulse, whereby said bistable circuit is locked in the reset state as long as said set pulse prevails.

2. A system as claimed in claim 1, wherein said blocking circuit further includes a delay circuit means which has one input connected to said clock circuit, and another input connected to said output of said bistable circuit, said delay circuit means having an output for supplying said set pulse to said counter in order to set said certain of said n digits of said counter to said predetermined binary value.

3. A system as claimed in claim 2, wherein said delay circuit means comprises a first AND-circuit with two inputs and an output, one of said inputs being connected to said clock circuit and the other of said inputs being connected to said output of said bistable circuit, said output of said AND-circuit thus transmitting output signals in response to said stepping pulses when said bistable circuit is in the set state, a first monostable circuit which is set by said output signals from said AND-circuit and automatically resets after a first time interval, during which an output signal is present, a second monostable circuit which is set by said stepping pulses and automatically resets after a second time interval, during which an output signal is present, a second AND-gate with two inputs and an output, one of said inputs being an inverting input and the other of said inputs being a non-inverting input, said inverting input receiving said output signal of said second monostable circuit and said non-inverting input receiving said output signal of said first monostable circuit, whereby said second AND-gate transmits an output signal while said first monostable circuit is set under the condition that said second monostable circuit is reset.

* * * * *